United States Patent [19]
Jones

[11] Patent Number: 5,829,854
[45] Date of Patent: *Nov. 3, 1998

[54] ANGLED COLOR DISPERSEMENT AND RECOMBINATION PRISM

[75] Inventor: Philip J. Jones, Menlo Park, Calif.

[73] Assignee: Raychem Corporation, Menlo Park, Calif.

[*] Notice: This patent issued on a continued prosecution application filed under 37 CFR 1.53(d), and is subject to the twenty year patent term provisions of 35 U.S.C. 154(a)(2).

[21] Appl. No.: 721,158

[22] Filed: Sep. 26, 1996

[51] Int. Cl.$^6$ .................................................. G03B 21/14
[52] U.S. Cl. .................................. 353/33; 353/34; 353/81
[58] Field of Search .................................. 353/33, 31, 34, 353/37, 81

[56] References Cited

U.S. PATENT DOCUMENTS

| | | | |
|---|---|---|---|
| 3,932,027 | 1/1976 | Cook et al. | 350/173 |
| 4,913,528 | 4/1990 | Hasegawa | 353/33 |
| 4,943,154 | 7/1990 | Miyatake et al. | 353/31 |
| 4,943,155 | 7/1990 | Cross, Jr. | 353/33 |
| 4,969,730 | 11/1990 | Van Den Brandt | 353/34 |
| 4,983,032 | 1/1991 | Van Den Brandt | 353/33 |
| 5,309,188 | 5/1994 | Burstyu | 353/33 |
| 5,357,289 | 10/1994 | Konno et al. | 353/33 |
| 5,604,624 | 2/1997 | Magarill | 353/81 |
| 5,704,701 | 1/1998 | Kavanagh et al. | 353/33 |
| 5,777,789 | 7/1998 | Chiu et al. | 353/33 |

OTHER PUBLICATIONS

Nagae et al., SID 95 Digest, pp. 223–226 (1995).

*Primary Examiner*—William Dowling
*Attorney, Agent, or Firm*—Herbert G. Burkard; Yuan Chao

[57] ABSTRACT

An image projection arrangement is provided. The arrangement includes a light source assembly for producing a first light beam. A reflective image display system is arranged in the path of the first light beam and has at least one cell for generating an image to be projected. A projection lens system is arranged in the path of a second light beam originating from the image display system for projecting the image produced by the image display system onto a projection screen. Between the light source assembly and the image display system on the one hand, and between this system and the projection lens system on the other hand, a transition from a first to a second medium is provided. This transition occurs at an interface having a normal direction. The first and second media have different refractive indices. The transition is arranged such that one of the first and second light beams is totally reflected by the transition while the other light beam is transmitted by the transition. Between the light source assembly and the image display system on the one hand, and between this system and the projection lens system on the other hand, an angle is formed, the bisector of this angle defining an optic axis of the system. The bisector of the angle is not parallel to the interface normal.

18 Claims, 4 Drawing Sheets

ANGLED COLOR DISPERSEMENT AND RECOMBINATION PRISM

TECHNICAL FIELD OF THE INVENTION

The present invention is directed to projection prisms, and more particularly to an angled color projection prism for dispersing and recombining light.

BACKGROUND OF THE INVENTION

Color dispersement and recombination are important aspects of color projection systems. In these systems, white light is created from, for example, an arc lamp. A prism or other such device is used to disperse the white light into three components: a red beam, a green beam and a blue beam. These beams may be directed to reflective liquid crystal cells that interfere with and selectively reflect each beam. In other words, the interference imparts an image to each color beam. More particularly, the reflective liquid crystal cells are often active matrix cells with a switching element for each pixel allowing each pixel to be individually addressed. The colors are recombined, and when projected on a screen form a full color image.

U.S. Pat. No. 4,943,154, issued Jul. 24, 1990, discloses a prior art projection system, as shown in FIG. 1. This system comprises a light source 50; light transmitter 59; light valves 61, 62 and 63, a light combiner 64; a projection lens 65; a drive circuit 67; an input side convergent lens 68; an input side plane mirror 69; a central convergent lens 70; an output side plane mirror 71; and an output side convergent lens 72. The light source 50 comprises a lamp 51, a condenser lens 52, a concave mirror 53 and a heat absorbing filter 54. The lamp 51 radiates a white light containing three primary colors of red, green and blue. Rays of the radiant light from the lamp 51 are arranged in approximately parallel rays by the condenser lens 52 and the concave mirror 53. More specifically, the rays of light from the center of a luminous element 55 in the lamp 51 are transmitted in parallel to the optic axis 57 by the condenser lens 52. From the light rays passed through the condenser lens 52 infrared rays are eliminated with the heat absorbing filter 54. The light rays from the light source 50 are separated into three primary color beams of red, green and blue. Red light passes through the light transmitter 59 and enters the red light valve 61. Green light is similarly transmitted to the green light valve 62, and blue light is transmitted to the blue light valve 63. A light separator 90 is used to disperse the light into colored beams of red, green and blue. Separator 90 is shown having two plates 92 and 94. The transmissive and reflective properties of these plates are shown in the graphs of FIGS. 2(a) and 2(b). FIG. 2(a) is a graph of transmission (in percent) as a function of wavelength (in nanometers (nm)) for plates 92 and 94, corresponding to curves A and B, respectively. FIG. 2(b) is a graph of reflection (in percent) as a function of wavelength (in nanometers) for the same plates. In particular, FIG. 2(a) shows that plate 92, corresponding to curve A, has a low transmissivity for blue light but a high transmissivity for green and red. Plate 94, corresponding to curve B, has a low transmissivity for blue and green light but a high transmissivity for red. Put another way, and as shown in FIG. 2(b), plate 92 reflects the blue light but transmits green and red. Of the green and red light that remains, plate 94 reflects the green but transmits the red. Thus, the two plates may be used to disperse the light before the light enters light valves 61, 62 and 63.

The light valves 61, 62 and 63 are liquid crystal panels each having matrix electrodes. Such panels generally have a plurality of picture elements which change from a more scattering state to a less scattering state upon application of an input such as an electric field, magnetic field, etc. The drive circuit 67 produces electric signals R, G and B according to a video signal Y to control the transmittance of pixels in respective light valves 61, 62 and 63. The modulated light outputs from the light valves 61, 62 and 63 are then combined into a composite flux of light substantially to reproduce a color picture at the position of the light valve 62. An enlarged image of the color picture is finally projected by the projection lens 65 on a screen 66.

Light combiner 64 may also be used to disperse the light into the different colors (this system is not shown). In this case, the light disperser/combiner often includes dichroic surfaces such as coated plates of glass or an internally-coated cemented prism structure. Coatings used as dichroic surfaces are typically thin films.

A disadvantage of coated plates is that such plates can introduce astigmatism in the optical path. Inserting additional non-coated plates may compensate for this defect at the expense of simplicity.

Prism structures have many advantages. They are typically rugged, easy to mount, and useful for beam superposition applications. They deform less when subjected to stress than coated plates. Coatings used in prisms are resistant to degradation because they are usually sealed within the body of the cube.

Prism structures may also have some disadvantages. One may be a polarization dependence of the reflected light arising from the coatings for the interior surfaces. These coatings may be multilayered and reflective. As the angle of the plane of the coating to the direction of light moves away from 90°, spectral differences between the polarization components increase. In other words, the reflected light becomes at least partially polarized for some range of wavelengths, referred to as the transition region.

This effect may be seen, e.g., in FIG. 3(a), which shows the corresponding curves for transmittance for a short-wave-pass beamsplitter or prism at 45°. In FIG. 3(a), the transmission (in percent) is plotted versus wavelength (in nm). The action of the beamsplitter is seen to be dependent on the polarization of the light. S-polarized light, i.e., light which has its electric field perpendicular to the plane of incidence, has a transmittance curve which is shifted relative to that for p-polarized light, the latter being light which has its electric field parallel to the plane of incidence. The amount of shifting is seen to be roughly 50 nm towards lower wavelengths. Thus, the transition region, in which polarization components may be subject to spectral differences, is about 50 nm wide.

Some beamsplitters have been constructed which reduce the spectral difference between the polarization components. FIG. 3(b) shows plots of wavelength (in nm) versus reflection (in percent) for light of random polarization (*), s-polarization (+), and p-polarization (x) for a blue mirror made by Doctor Optic, GmbH of Vienna, Austria. It is seen that the s-polarization component is shifted from the p-polarization component by about 5 nm. Thus, the transition region, in which polarization components may be subject to spectral differences, is much smaller and is about 5 nm wide.

The partially polarized light is usually incident on the cell which imparts an image to the light. The cell, which may use a scattering liquid crystal material, may have at least a partial depolarizing effect. This may be undesirable. For example, if the incident beam is highly polarized, and the cell depolarizes that same state of polarization, then the intensity of the beam passing back through the prism may be attenuated. In extreme cases, the intensity may drop to about half the incident intensity because the beam is not properly reflected.

This type of attenuation is generally caused by each of the three cells. The overall effect is to reduce the transmission of the prism system. For example, a typical ratio of the amount of light exiting the prism system to that entering is about fifty percent for dichroic surfaces that are oriented 45° to the direction of the light. For cells that use polarization of the light for their optical action, this polarizing effect can be used to increase their contrast ratio. However, this may severely attenuate the light intensity, perhaps by about sixty percent.

Some solutions have been proposed for the above problems. For example, U.S. Pat. No. 4,969,730, issued Nov. 13, 1990, discloses a prism system with two air gaps.

A serious disadvantage of these systems, particularly in reflective projection systems, is that "ghost" images from the entry air-glass interface may be considerable which are highly undesirable. These ghost images refer to stray reflections of incident light which are directed towards the projection lens. Such ghost images detract from the intensity of the properly modulated colored beams and add to noise in the projected image, decreasing the contrast either locally or over the whole picture.

In the above system with two air gaps, such reflections arise at the air gaps and may amount to, for example, several percent of the overall image intensity. If anti-reflection coatings are used on the surfaces bordering the air gap, this ghost image intensity may be reduced to fractions of a percent, e.g., 0.2% per anti-reflection-coated surface, or 0.4% for two anti-reflection coatings (on each side of the air gap).

As an example, at f/5 optics and assuming zero ghost images, one type of scattering cell, described in the 1995 SID Digest, pp. 223–226, inherently reflects in the "OFF" state about 0.8% of the incident light. Using the above reflectivity value (in the "ON" state) of 50%, this corresponds to a contrast ratio of about 50%/0.8% or about 62:1. This is a adequate value but is not exceptional. When ghost images are considered from the anti-reflection coatings, the contrast ratio becomes, using the numbers above, (50%+ 0.4%)/(0.8%+0.4%) or about 40:1. This is a considerable reduction from 62:1, and is a marginal contrast ratio. If one further takes into account other sources of stray light, which may be another 0.4%, the contrast ratio becomes (50%+ 0.4%+0.4%)/(0.8%+0.4%+0.4%) or about 30:1. This is generally an unacceptable contrast ratio.

Yet another drawback to these systems are that they are typically very complex to manufacture. This is especially true when they are compared to dichroic cross systems, the latter having almost all right angles.

Accordingly, an object of the invention is to provide an optic prism in which ghost images are minimized. Another object is to provide a prism system for color dispersement and recombination in which transmission and contrast ratio are maximized.

SUMMARY OF THE INVENTION

An image projection arrangement is provided. The arrangement includes a light source assembly for producing a first light beam. A reflective image display system is arranged in the path of the first light beam and has at least one cell for generating an image to be projected. A projection lens system is arranged in the path of a second light beam originating from the image display system for projecting the image produced by the image display system onto a projection screen. Between the light source assembly and the image display system on the one hand, and between this system and the projection lens system on the other hand, a transition from a first to a second medium is provided. This transition occurs at an interface having a normal direction. The first and second media have different refractive indices. The transition is arranged such that one of the first and second light beams is totally reflected by the transition while the other light beam is transmitted by the transition. Between the light source assembly and the image display system on the one hand, and between this system and the projection lens system on the other hand, an angle is formed, the bisector of this angle defining an optic axis of the system. The bisector of the angle is not parallel to the interface normal.

Implementations of the invention include the following. The light source assembly includes a light source and an element which is reflective, refractive, or a combination of both, this element to direct light from the light source to the image display system. The transition is constituted by an interface between air and a transparent material, and may be included in a prism system which includes two transparent prisms having an air gap between two facing surfaces of the prisms. An optically active coating may be located at the transitions between the first and second surfaces. The optically active coating may be a multilayer dichroic reflective coating or an antireflective coating.

The image display system further includes first, second and third cells for imparting images to the first, second and third components, respectively. These cells may be liquid crystal display cells having a plurality of picture elements which change from a more scattering state to a less scattering state upon application of an input such as an electric field which may be provided by one element of a matrix of CMOS semiconductors. The elements of a matrix of CMOS semiconductors are provided to form an active matrix liquid crystal display.

The angular difference between the bisector of the angle and the interface normal is between about ½ degree and about 10 degrees, and may be between about 1 degree and about 5 degrees, and may further be between about 2 degrees and about 3 degrees.

Additional objects and advantages of the invention will be set forth in the description which follows, and in part will be obvious from the description, or may be learned by practice of the invention. The advantages of the invention may be realized and obtained by means of the instrumentalities and combinations particularly pointed out in the claims.

BRIEF DESCRIPTION OF THE DRAWING(S)

The accompanying figures, which are incorporated in and constitute a part of the specification, schematically illustrate the invention and, together with the general description given above and the detailed description given below, serve to explain the principles of the invention.

FIG. 1 is a top plan view of a prior art projection system.

FIGS. 2(*a*) and 2(*b*) are graphs of transmissivity and reflectivity, respectively, for plates 92 and 94 of FIG. 1.

FIGS. 3(*a*) and 3(*b*) are graphs showing spectral differences between polarization components.

FIG. 4(*a*) and (*b*) are schematic views of an angled prism according to an embodiment of the present invention, (*a*) and (*b*) corresponding to different angles of orientation.

DESCRIPTION OF THE PREFERRED EMBODIMENTS

Figure 4A:
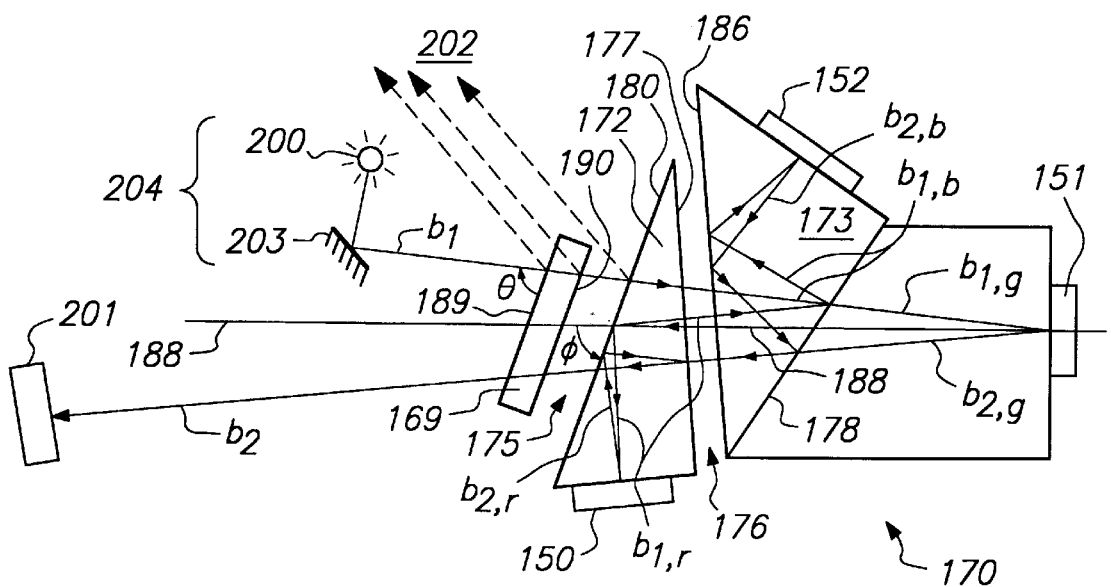

An image projection system according to an embodiment of the present invention is shown in FIG. 4(a). The system includes a prism system 170 by means of which both the beam separation, color splitting and color recombination are performed. The system 170 is formed from an optical element 169 and two prisms 171 and 172, a first air gap 175 defined by the opposing parallel plates of optical element 169 and prism 172, and another air gap 176 defined by the opposing parallel plates of the prisms 172 and 173. The prism 172 is coated with a first dichroic layer 177 and the prism 173 with a second dichroic layer 178. The optical element 169 may be, e.g., a lens, a prism, or even just air. If a lens or prism it has a front surface 189 and a back surface 190. Front surface 189 may in general be concave or convex.

In general, and as further described below, prism faces 180 and 186 provide total internal reflection surfaces. The faces on each side of air gap 175, one of which is face 180, may be coated with an anti-reflection coating.

A beam $b_1$ originating from a light source assembly 204 enters optic element 169 at angle $\phi$ and emerges into air gap 175. Beam $b_1$ may originate from a laser source and may thus be well-collimated to within fractions of a degree. Light source assembly 204 may include both a light source 200 and a mirror 203 for directing light from light source 200 to optic element 169. Of course, mirror 203 may be replaced with other reflective elements or even refractive elements as long as these elements have the capability of redirecting light.

In the figure, faces 189, 190, and 180 are shown mutually parallel and oriented at angle $\phi$ to an optic axis 188, where this optic axis is defined herein as the line bisecting incoming and outgoing light. While there is no requirement that the faces be mutually parallel, at least one of faces 189, 190, or 180 is oriented at an angle $\theta$ to optic axis 188 which is different from 90°. Preferably, these faces are parallel and none is perpendicular to optic axis 188. Of course, if optic element 169 is just air, the requirement is reduced to face 180 being non-perpendicular to the optic axis 188 as defined above. If these conditions are met, stray reflections or ghost images 202 from faces 189, 190, or 180 are not directed towards the projection lens, i.e., do not emerge at the same angle as the outgoing light.

This results in an absence of ghost images. The high contrast ratio calculated above, i.e., 62:1, is no longer a theoretical ideal but may be actually attained. Of course, the actual value may be higher or lower depending on the optical system. Nevertheless, the decrease in contrast ratio due to ghost images may be reduced or even eliminated in the case where faces 189, 190, and 180 are all non-perpendicular to the optic axis 188.

For the reasons discussed above, face 180 of prism 172 may be oriented at an angle to the optic axis 188 different from 90°, thus reducing ghost images along the path of the outgoing light beam.

After exiting optical element 169 and passing air gap 175, beam $b_1$ is incident on prism 172. Thereafter beam $b_1$ is incident on the dichroic layer 177 which reflects, for example, the red component $b_1$.

This beam component is incident at an angle larger than the critical angle onto the interface between the prism 172 and the air gap 175 and is totally internally reflected to the red display panel 150. The beam component $b_{2,r}$ modulated with the red image information is again totally reflected first from the air gap 175 and second from the dichroic layer 177 which reflects this beam component back along an exit axis towards an entrance aperture 201 of a projection lens system.

The beam having the color composition blue and green which is transmitted by dichroic layer 177 is incident on the second dichroic layer 178 which reflects the blue component $b_{1,b}$ and transmits the green component $b_{1,g}$ towards the green image display panel 151. The beam component $b_{2,g}$ modulated with the green image information is directly reflected along the exit axis and to entrance aperture 201.

The blue beam component $b_{1,b}$ reflected by the dichroic layer 178 is totally reflected from the air gap 176 to the blue image display panel 152. The beam component $b_{2,b}$ modulated with the blue image information is first totally reflected from the air gap 176 and is thereafter reflected by the dichroic layer 178 and combined with the green beam component $b_{2,g}$. At the dichroic layer 177 these beam components are combined with the red beam component $b_{2,r}$ and the complete beam $b_2$ is obtained which is modulated with the color image information. This beam is transmitted along the exit axis and towards entrance aperture 201.

Beam display panels 150, 151 and 152 may be, for example, active matrix liquid crystal displays. Such displays may use a matrix of nonlinear devices on a glass or fused silica substrate. Also, a matrix of transistor structures may be used. In the case of reflective displays, the substrate can be opaque such as may be provided by single crystal silicon. The nonlinear devices allow individual control over each display picture element or pixel. The matrix devices are often amorphous or polycrystalline silicon thin film transistors; however, thin film diodes and metal-insulator-metal devices also have been employed. CMOS semiconductor devices may additionally be used.

Figure 4B:
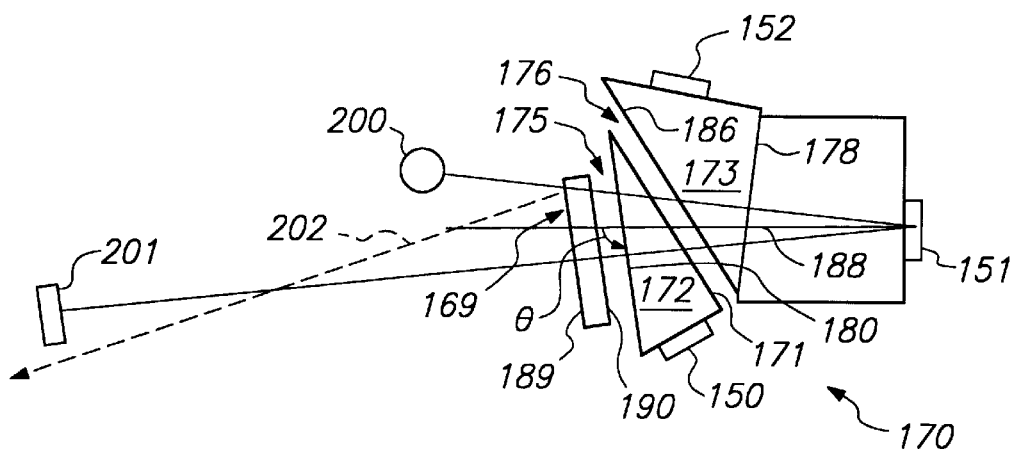

FIGS. 4(a) and (b) exhibit the result of having faces 189, 190, or 180 (or any combination or subcombination thereof) non-perpendicular to optic axis 188. In FIG. 4(a), source 200 provides the incoming beam which is later collected by a projection system, shown schematically by entrance aperture 201. For clarity, most of the reflections of the beams inside prism 170 are not shown. The beam directly reflected from green cell 151 is, however, shown. FIGS. 4(a) and 4(b) show different values of angle $\phi$. In both FIGS. $\phi$ is different from 90°, i.e., optic axis 188 is not perpendicular to faces 189, 190 and 180. The angular difference by which $\phi$ is different from 90° may vary, but an angular difference of between about ½ degree and about 10 degrees has been found adequate. An angular difference of between about 1° and about 5° is also useful. An angular difference of between about 2° and about 3° has also been used. If a well-collimated source is used, such as a laser, an angular difference of only a fraction of a degree may suffice.

Because of the orientation of faces 189, 190 and 180, stray reflections or ghost images are minimized. For example, ray 202 is a typical stray reflection caused by the air-glass interface at face 189. Faces 190 and 180 would typically cause other such reflections. However, the orientation of the faces causes stray reflection 202 to be directed away from the outgoing beam. That is, such reflections are not directed into entrance aperture 201.

Figure 1:
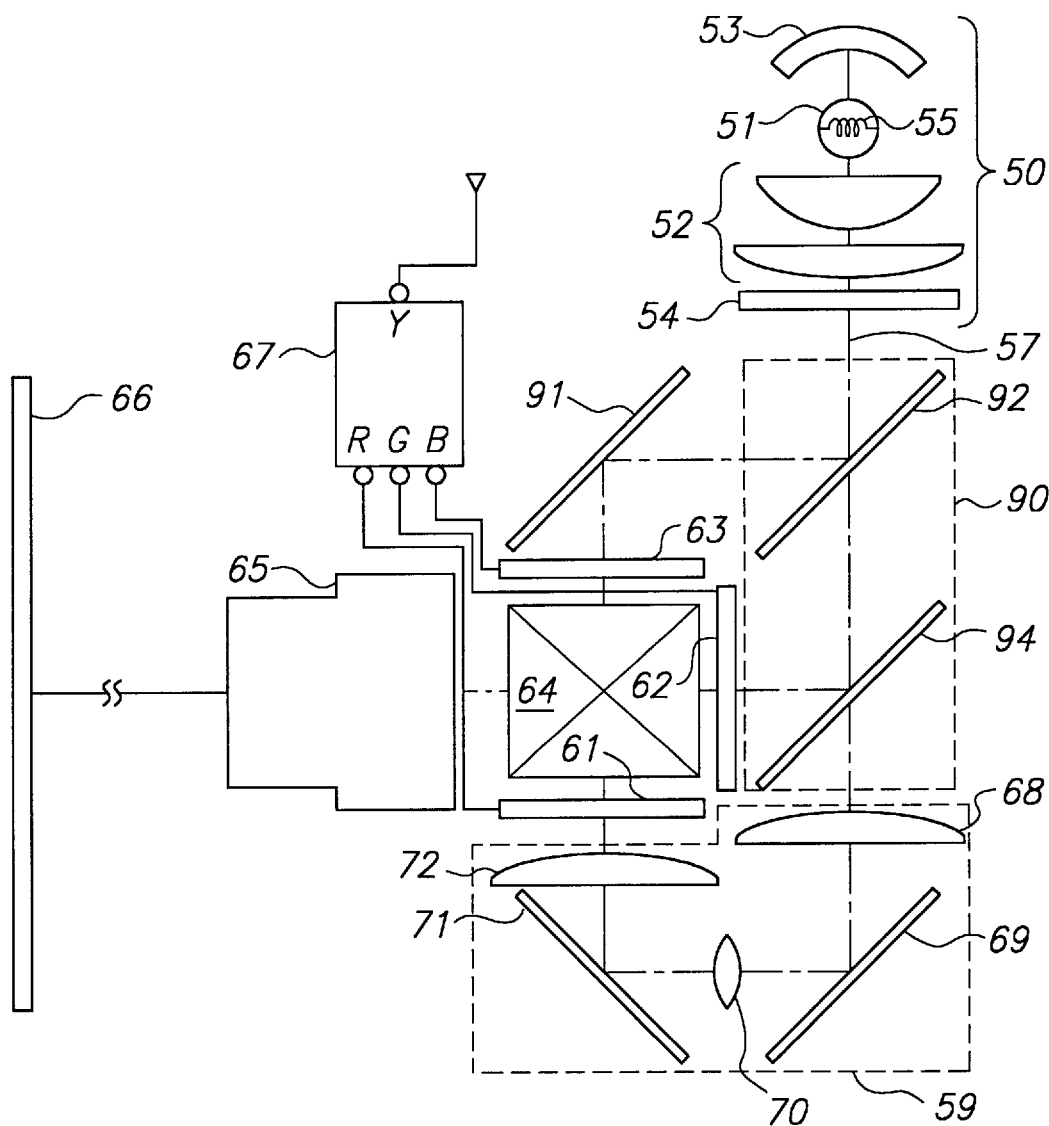
Figure 2A:
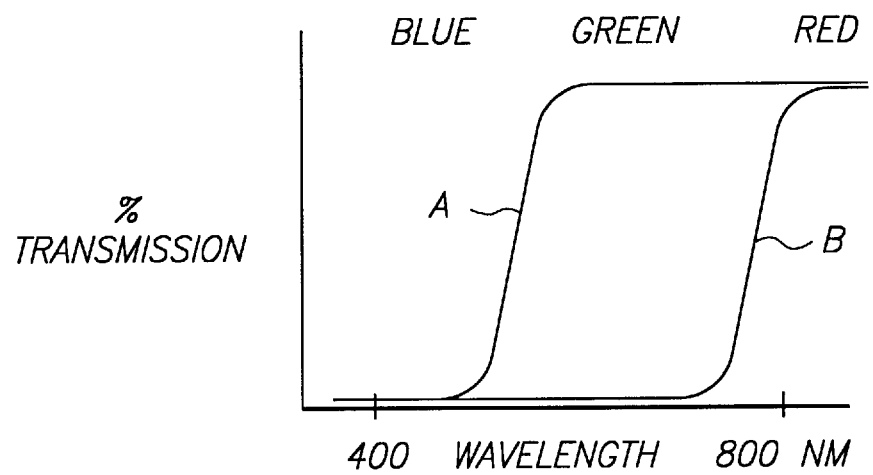
Figure 2B:
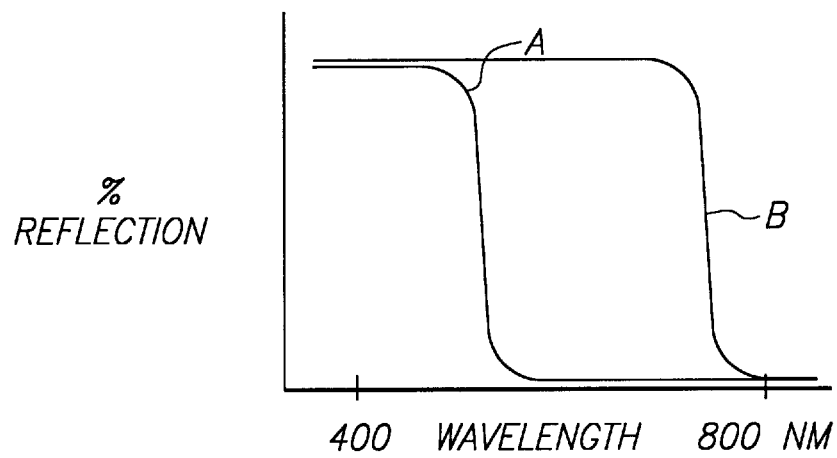
Figure 3A:
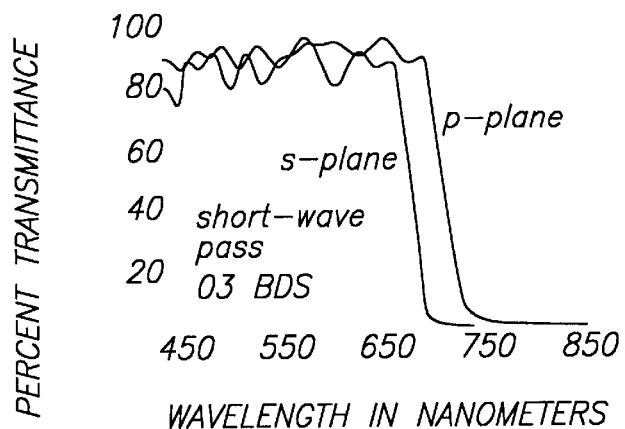
Figure 3B:
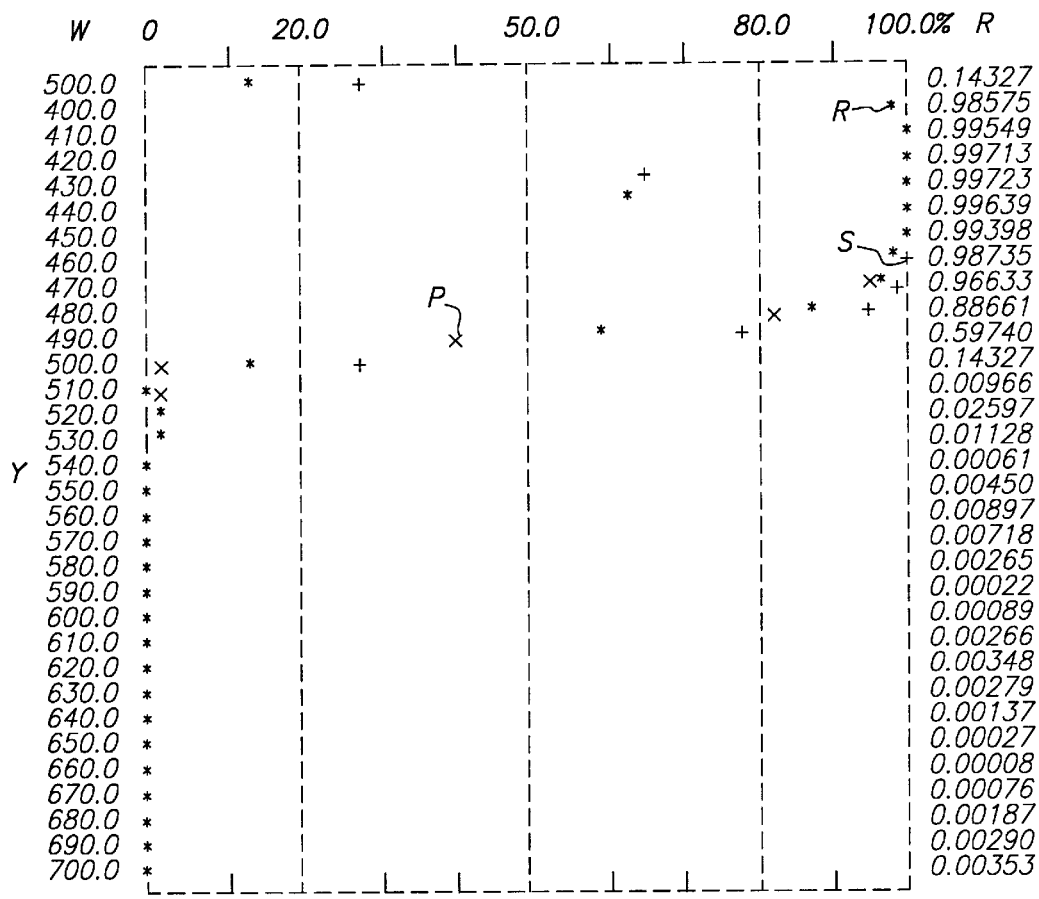

The choice of which color beam is reflected first is dependent on the nature of surface 177 and may be changed according to the preference of the user. Usually either blue or red is reflected first because 1) they are nearer to the ends of the spectrum and 2) high and low pass reflectors are easier to form than band pass reflectors. In particular, the coating of surface 177 is a multilayer stack of alternating refractive index materials, e.g., silicon dioxide with a refractive index of about 1.5 and alumina with a refractive index of about 1.7. The thickness of each layer is designed to reflect substantially all light below a certain wavelength, e.g., for blue, 490 nm is used. For red light, they are designed to reflect substantially all light above a certain wavelength, e.g., 570 nm. The reflection from surface 177 may cause some disparity between the s-polarized and p-polarized portions of the blue beam, as described above in connection with FIG. 3(a).

Moreover, the light need not be separated into 3 colors of red, green and blue. For example, a suitable choice of filters, which may include a plurality of dichroic surfaces, may separate the white light into four or even more beams.

It should be noted that the dichroic coatings described above may be replaced with any optically active coatings as dictated by the requirements of the user.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure, such feature can also be used, to the extent appropriate, in the context of another figure, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. An image projection arrangement, comprising:
    a light source assembly for producing an initial light beam having an initial direction;
        an image display system arranged in the path of the initial light beam and having three cell systems for generating portions of an image to be projected, including:
        at least two transitions arranged in the path of the initial light beam for separating the initial light beam into three component beams, each component beam containing light of a different frequency band, and each component beam directed towards a respective one of said three cell systems;
        wherein a first transition has a normal and is structured and arranged to reflect light within a first frequency band towards a first cell system and to transmit light having frequencies not within said first frequency band towards a second transition;
        wherein a second transition is structured and arranged to reflect light within a second frequency band towards a second cell system and to transmit light having frequencies not within said second frequency band towards a third cell system; and
    a projection lens system arranged in the path of a light beam emanating from the image display system for projecting the image produced by the image display system onto a projection screen, the initial direction and the path of the light beam emanating from the image display system towards the projection lens system forming an angle having a bisector, such that the angle bisector forms an angle with the normal of between about one-half and 10 degrees.

2. The image projection arrangement of claim 1, wherein said light source assembly includes a light source and a reflective element to direct light from said light source to said image display system.

3. The image projection arrangement of claim 1, wherein the at least two transitions are each constituted by an interface between air and a transparent material.

4. The image projection arrangement of claim 1, wherein the at least two transitions are included in a prism system which includes two transparent prisms having an air gap between two facing surfaces of the prisms.

5. The image projection arrangement of claim 1, wherein said three cell systems include liquid crystal display cells having a plurality of picture elements which change from a more scattering state to a less scattering state upon application of an input.

6. The image projection arrangement of claim 1, further comprising an optically active coating at said at least two transitions.

7. The image projection arrangement of claim 6, wherein said optically active coating is a multilayer dichroic reflective coating.

8. The image projection arrangement of claim 6, wherein said optically active coating is an antireflective coating.

9. The image projection arrangement of claim 5, wherein said input is an electric field.

10. The image projection arrangement of claim 9, wherein said electric field is provided by one element of a matrix of CMOS semiconductors.

11. The image projection arrangement of claim 10, wherein a plurality of said elements of a matrix of CMOS semiconductors are provided to form an active matrix liquid crystal display 12. The image projection arrangement of claim 1, wherein an angle between the angle bisector and the normal is between about 1 degree and about 5 degrees.

13. The image projection arrangement of claim 12, wherein the angle between the angle bisector and the normal is between about 2 degrees and about 3 degrees.

14. The image projection arrangement of claim 1, wherein said light source assembly includes a light source and a refractive element to direct light from said light source to said image display system.

15. The image projection arrangement of claim 1, wherein said light source assembly includes a light source and a combination element which is reflective and refractive to direct light from said light source to said image display system.

16. The image projection arrangement of claim 1, wherein said at least two transitions are dichroic surfaces.

17. A method of modulating a light beam, comprising the steps of:
    producing an initial light beam having an initial direction;
    separating the initial light beam into at least three component beams in an image display system, and recombining the at least three components into a light beam, including steps of:
        (i) passing said initial light beam to a first transition, said first transition having a normal;
        (ii) reflecting light from said first transition within a first frequency band towards a first cell system;
        (iii) transmitting light from said first transition having frequencies not within said first frequency band towards a second transition;

(iv) reflecting light from said second transition within a second frequency band towards a second cell system;

(v) transmitting light from said second transition having frequencies not within said second frequency band towards a third cell system; and (vi) recombining the light from the first, second, and third cell systems;

passing the recombined light from the image display system to a projection lens system;

such that the initial direction and the direction of the light beam passed from the image display system towards the projection lens system form an angle having a bisector, and such that the angle bisector forms an angle with the normal of between about one-half degree and 10 degrees.

18. An image projection arrangement, comprising:

a light source assembly for producing an initial light beam having an initial direction;

an image display system arranged in the path of the initial light beam and having three cell systems for generating portions of an image to be projected, including:

at least two transitions arranged in the path of the initial light beam for separating the initial light beam into three component beams, each component beam containing light of a different frequency band, and each component beam directed towards a respective one of said three cell systems;

wherein a first transition is substantially planar and has a perpendicular direction associated therewith, said first transition structured and arranged to reflect light within a first frequency band towards a first cell system and to transmit light having frequencies not within said first frequency band towards a second transition;

wherein a second transition is structured and arranged to reflect light within a second frequency band towards a second cell system and to transmit light having frequencies not within said second frequency band towards a third cell system; and a projection lens system arranged in the path of a light beam emanating from the image display system for projecting the image produced by the image display system onto a projection screen, the initial direction and the path of the light beam emanating from the image display system towards the projection lens system forming an angle having a bisector, such that the angle bisector forms an angle with the perpendicular direction of between about one-half and 10 degrees.

* * * * *